United States Patent [19]
Ohno et al.

[11] Patent Number: 4,605,111
[45] Date of Patent: Aug. 12, 1986

[54] HOIST

[75] Inventors: Masayuki Ohno, Tokyo; Kazuo Maeda, Yokohama, both of Japan

[73] Assignee: Kabushiki Kaisha Kito, Kawasaki, Japan

[21] Appl. No.: 524,715

[22] Filed: Aug. 19, 1983

[30] Foreign Application Priority Data

Aug. 25, 1982 [JP] Japan ............................... 57-146213

[51] Int. Cl.[4] ........................ F16D 15/00; F16D 67/02

[52] U.S. Cl. ........................................ 192/16; 192/15; 192/56 R; 254/346; 254/355; 254/372; 254/380; 464/36

[58] Field of Search .................... 192/14, 15, 16, 56 R, 192/46, 108; 464/36, 38, 39; 254/346, 355, 372, 380

[56] References Cited

U.S. PATENT DOCUMENTS

| | | | |
|---|---|---|---|
| 2,166,004 | 7/1939 | Hall | 192/108 |
| 2,501,096 | 3/1950 | Robins et al. | 192/15 |
| 3,185,275 | 5/1965 | Orwin | 192/56 R |
| 3,547,242 | 12/1970 | Braggins | 192/56 R |
| 3,572,482 | 3/1971 | Kalpas et al. | 192/15 |
| 3,770,086 | 11/1973 | Jackson et al. | 192/16 |
| 4,348,011 | 9/1982 | Honda | 254/380 |

FOREIGN PATENT DOCUMENTS

| | | | |
|---|---|---|---|
| 2031539 | 12/1971 | Fed. Rep. of Germany | 192/56 R |
| 1324977 | 3/1963 | France | 464/36 |

*Primary Examiner*—Rodney H. Bonck
*Assistant Examiner*—Alan G. Towner
*Attorney, Agent, or Firm*—Sughrue, Mion, Zinn, Macpeak & Seas

[57] ABSTRACT

A hoist includes a shaft driven by external force, a driving shaft connected to the shaft, a reduction gear train for transmitting rotation of the driving shaft to a load sheave, a mechanical brake assembly in the reduction gear train, and an overload safety device having a clutch mechanism capable of transmitting torque larger in driving said load sheave in a winding-off direction than that in a winding-up direction. According to the invention, the clutch mechanism comprises a disc-like driving member, a disc-like driven member, surfaces of these members facing to each other being formed with a plurality of recesses which are arranged in circles on the surfaces of these members and in opposition to each other, slide elements each accommodated in each set of the opposite recesses respectively formed in these members, and resilient urging means for urging the slide elements between the driving and driven members, any one of each set of the recesses having a gentle slope surface facilitating each the slide element to ride thereon and slip when driving the load sheave in the winding-up direction.

The hoist according to the invention is capable of automatically preventing the lifting, lowering or dragging of a load under overload condition, and enabling the once lifted load to be securely lowered regardless of its light or heavy weight, and is simple in construction, easy to assemble and adjust and suitable for mass-production.

8 Claims, 9 Drawing Figures

HOIST

BACKGROUND OF THE INVENTION

1. Field of the Invention

This invention relates to a hoist having overload safety means for preventing lifting, lowering and dragging under overload condition and capable of securely lowering a load irrespective of its weight.

2. Description of the Prior Art

With hoists such as electric chain blocks whose load sheave is driven through reduction gears by electric motors, it has been proposed to provide on a driven shaft of a reduction gear mechanism a brake assembly consisting of a brake support member, a brake retainer member, a brake ratchet wheel and friction plates between the members and further provide an overload safety device including frictional connections interposed between the brake retainer member and a driven gear fitted thereon to prevent lifting of a load by slippage in the overload safety device when the load sheave is subjected to an overload.

With this such as electric hoist, however, the friction transmission force of the overload safety device often becomes less than that of the brake assembly owing to its overtightening, so that once lifted the load cannot be lowered due to slippage in the overload safety device.

In order to solve this problem, it has been proposed to interpose a one-way clutch between the driven gear and the brake retainer member to render inoperative the overload safety device when lowering the load, as disclosed for example in Japanese Patent Application Publication No. 42,937/78. In this case, however, as the overload cannot be prevented in lowering the load, it is indispensably required to provide a limit switch for detecting a lowermost position of the load in view of the safety in operation which would possibly make the hoist complicated.

Moreover, another type of hoist having an overload safety device has been disclosed in U.S. Pat. No. 3,770,086 which overload safety device comprises a driving member threadedly engaged with a driving shaft and formed with a number of bottomed radial recesses opening at the outer periphery of the driving member, a member arranged about the driving member, fixed to a hand wheel and provided with a number of cuts each having a gentle slope surface in one direction in opposition to the above bottomed recess, and rollers and springs accommodated in the bottomed recesses so as to urge the rollers toward the cuts of the member by the springs to provide a difference in torque for winding-up and winding-off a load. With such a hoist, however, the number of rollers received in the number (more than ten) of recesses and urged toward the cuts by the springs make complicated the construction of the hoist and render difficult its assembling and adjustment of the spring urging force so as not to be suitable for mass-production.

SUMMARY OF THE INVENTION

It is therefore a primary object of the invention to provide an improved electric hoist which solves these problems of the prior art.

It is a general object of the invention to provide an improved hoist which comprises between a rotor shaft and a driving shaft or in the torque transmission system a clutch mechanism constructed as its winding-off torque larger than its winding-up torque, thereby automatically preventing the lifting, lowering or dragging of a load under overload condition, and enabling the once lifted load to be securely lowered regardless of its light or heavy weight, and which is simple in construction, easy to assemble and adjust and suitable for mass-production.

In order to achieve the above objects, in a hoist including a shaft driven by external force, a driving shaft connected to said shaft, a reduction gear train for transmitting rotation of said driving shaft to a load sheave, a mechanical brake assembly in said reduction gear train, and an overload safety device having a clutch mechanism capable of transmitting torque larger in driving said load sheave in a winding-off direction than that in a winding-up direction, according to the invention the clutch mechanism comprises a disc-like driving member, a disc-like driven member, surfaces of these members facing each other being formed with a plurality of recesses which are arranged in circles on the surfaces of these members and in opposition to each other, slide elements each accommodated in each set of said opposite recesses respectively formed in these members, and resilient urging means for urging said slide elements between said driving and driven members, any one of each set of the recesses having a gentle slope surface facilitating each said slide element to ride thereon and slip when driving said load sheave in the winding-up direction.

In a preferred embodiment of the invention, the slide elements are balls, and each of the recesses formed in any one of the driving and driven members is a circular recess to snugly accommodate therein substantially one half of each of balls, and each of the recesses in opposition to the above circular recesses consists of a semicircular portion to be fitted with the ball and the gentle slope surface.

In another preferred embodiment of the invention, the slide elements are pentagonal bodies each including a steep slope surface and the gentle slope surface, and each of the recesses formed in any one of the driving and driven members is a square recess to snugly accommodate therein substantially one half of each the pentagonal body and each of the recesses in opposition to the above square recesses has a steep slope surface and the gentle slope surface.

In order that the invention may be more clearly understood, preferred embodiments will be described, by way of example, with reference to the accompanying drawings.

Figure 1:
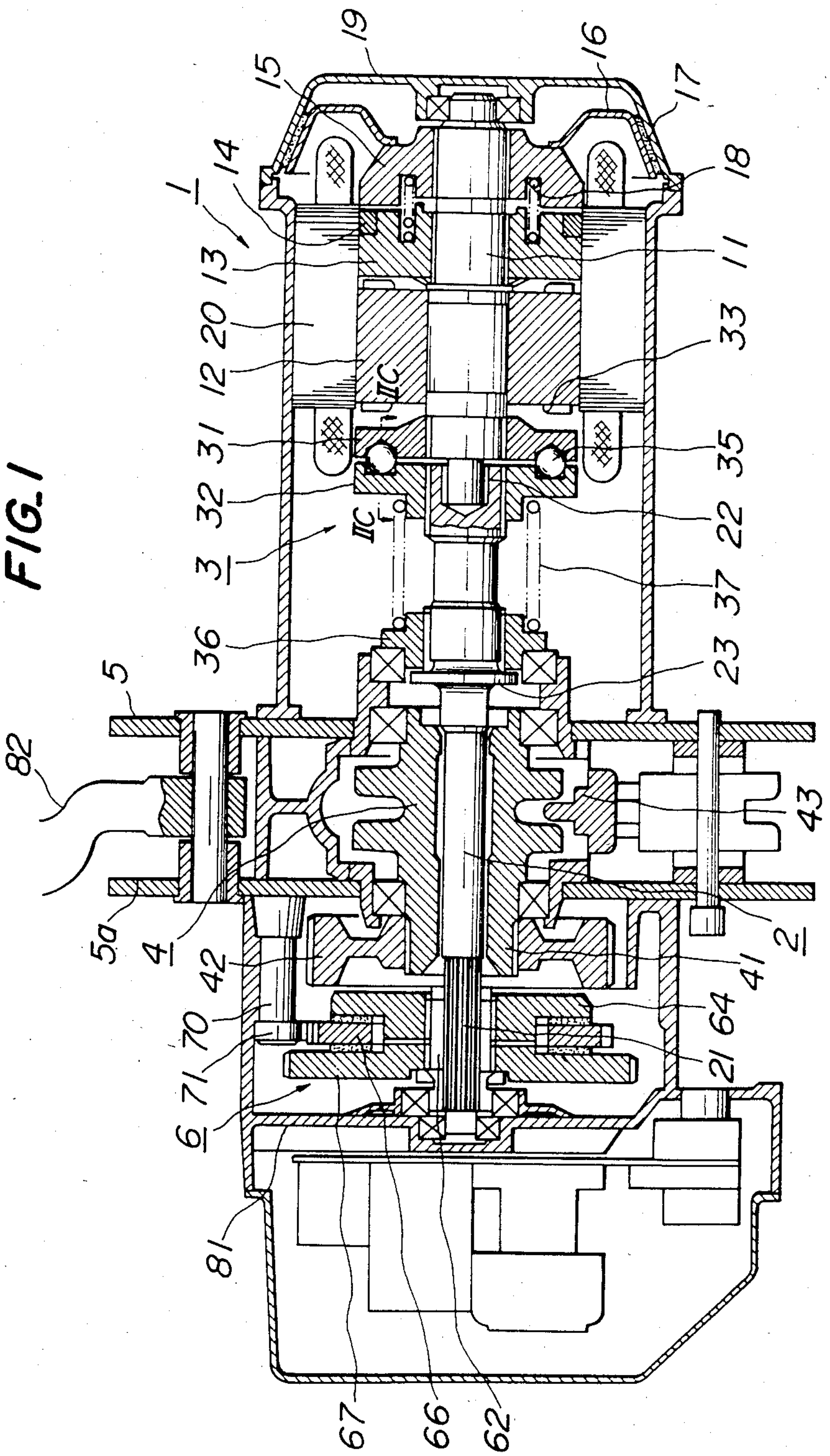
FIG. 1 is a longitudinal sectional view of one embodiment of a hoist according to the invention.
Figure 3:
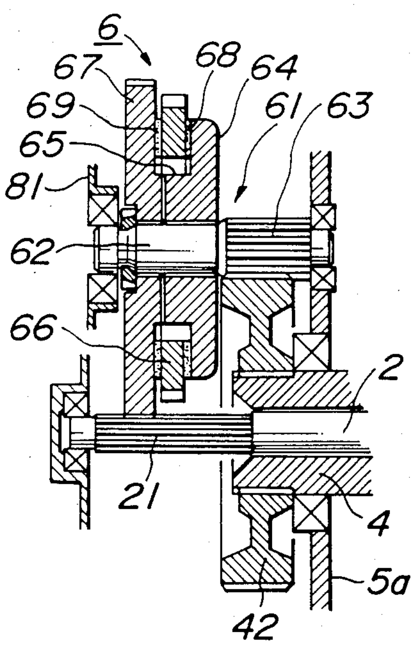
Figure 4:
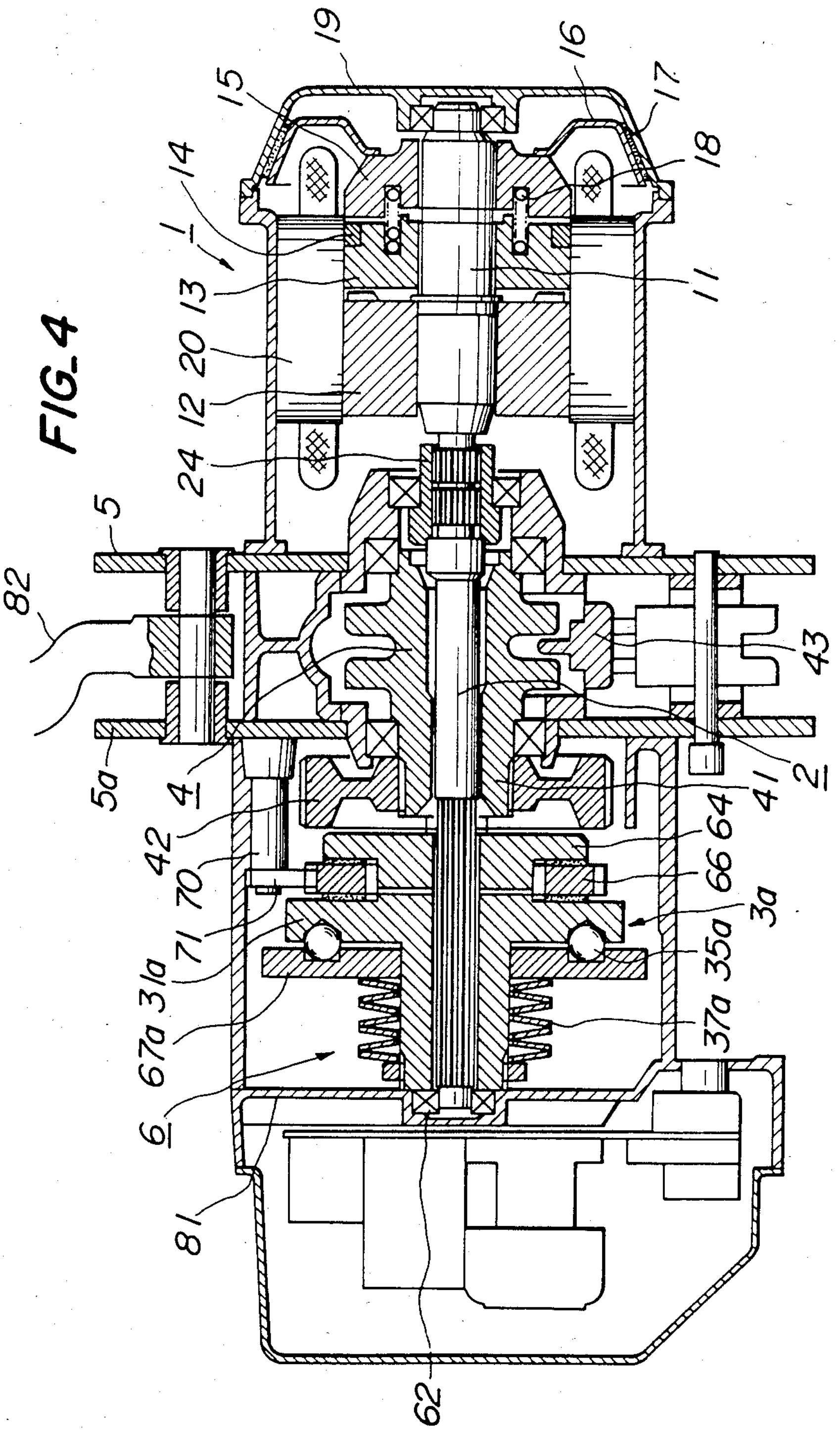
Figure 5:
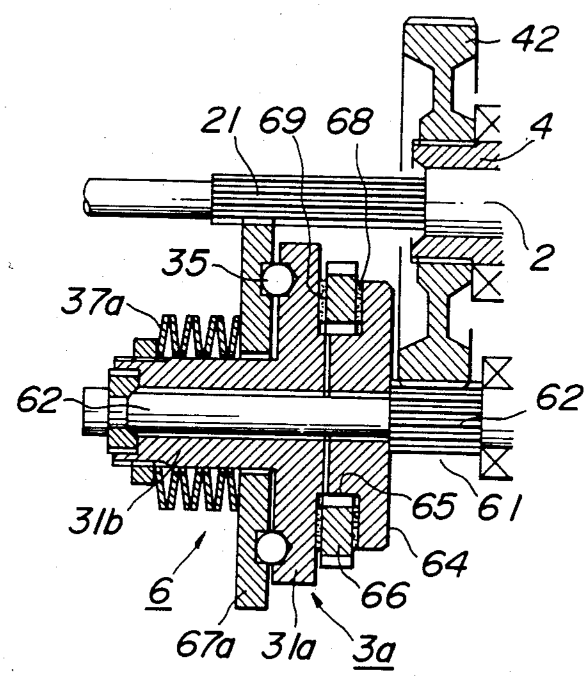
Figure 6A:
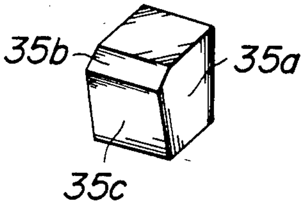
Figure 6B:
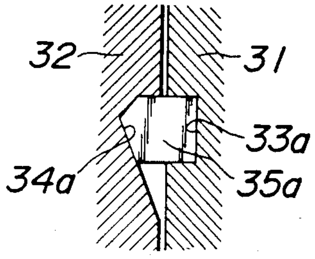

FIG. *2a* is a plan view of a support member of a clutch mechanism used in the hoist shown in FIG. 1;

FIG. *2b* is a plan view of a retainer member of the clutch mechanism shown in FIG. 1;

FIG. *2c* is a sectional view taken along the line IIC—IIC in FIG. 1;

FIG. 3 is a sectional view of a mechanical brake assembly used in the hoist shown in FIG. 1;

FIG. 4 is a longitudinal sectional view of another embodiment of the hoist according to the invention;

FIG. 5 is a sectional view of a mechanical brake assembly used in the hoist shown in FIG. 4;

FIG. 6a is a perspective view of a slide element used for a modified clutch mechanism according to the invention; and FIG. 6b is a sectional view illustrating an important part of the modified clutch mechanism using the slide elements shown in FIG. 6a.

DETAILED DESCRIPTION OF THE PREFERRED EMBODIMENT

Referring to FIG. 1 illustrating one embodiment of the invention, an electric hoist comprises an electric motor 1 including a rotor 12 fixed to a rotor shaft 11, a magnetic pole member 13 and an attracted member 15 made of a magnetic material with a disc 16 provided on its outer periphery with a friction plate 17. The magnetic pole member 13 and the attracted member 15 are axially slidably fitted on the rotor shaft 11 with spline connections or the like. Between the magnetic pole member 13 and the attracted member 15 is interposed a spring 18 normally resiliently urging the attracted member 15 to the right as viewed in FIG. 1 to force the friction plate 17 against a front frame 19. The magnetic pole member 13 is made of a non-magnetic material and is provided on its one surface in opposition to the attracted member 15 with a number of attractor elements 14 made of a magnetic material radially embedded in the magnetic pole member 13. A reference numeral 20 denotes a stator of the motor.

Figure 2A:
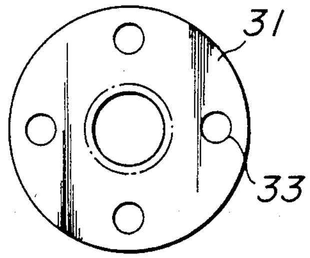
Figure 2B:
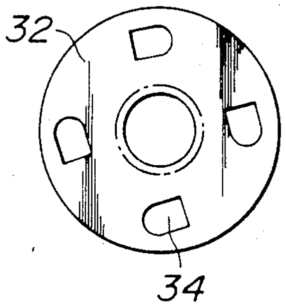
Figure 2C:
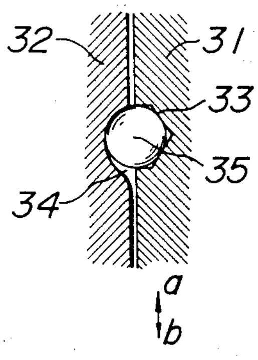

The electric hoist further comprises a driving shaft 2 having at its one end a pinion 21 and connected to the rotor shaft 11, and a clutch mechanism 3 interposed in a connection between the rotor shaft 11 and the driving shaft 2. The clutch mechanism 3 comprises a driving member 31 in the form of a disc fitted on the rotor shaft 11 by means of spline grooves or the like, a driven member 32 in the form of a disc fitted on the driving shaft 2 by means of spline grooves or the like, balls 35 interposed between the driving and driven members 31 and 32, a spring seat 36 fitted on the driving shaft 2 and positioned thereon by a flange of the driving shaft 2, resilient urging means 37 such as a coil spring interposed between the spring seat 36 and the driven member 32 and the like. FIGS. 2a–2c illustrate the driving and driven members 31 and 32 and balls 35 in detail. The driving member 31 is formed in a surface facing to the driven member 32 with a plurality of recesses 33 equally spaced apart to each other along its outer circumference and having a diameter substantially equal to that of the balls 35 as shown in FIG. 2a to snugly accommodate substantially halves of the balls. The driven member 32 is also formed in a surface facing to the driving member 31 with a plurality of recesses 34 correspondingly to the recesses 33 of the driving member 31. Each the recess 34 consists of a semicircular portion adapted to be fitted with the ball 35 and a gentle slope surface portion as shown in FIGS. 2b and 2c. The balls 35 accommodated in the recesses of the driving and driven members are urged by the coil spring 37.

Under an overload condition, when the clutch mechanism 3 is actuated to rotate the driving member 31 in a winding-up direction or a direction shown by an arrow b, the balls 35 slip along the slightly sloped surface portions of the recesses 34. On the other hand, when the driving member 31 is rotated in a winding-off direction or a direction shown by an arrow a, the balls 35 slip over the semicircular portions of the recesses 34. In this manner, with this clutch mechanism 3, the transmission force of the clutch mechanism in the winding-off direction is larger than that in the winding-up direction owing to the difference in resistance when the mechanism is slipped.

A load sheave 4 having at its one end a shaft 41 is loosely fitted on the driving shaft 2 and journaled in bearings in frames 5 and 5a. A driving gear 42 is fixedly fitted on the shaft 41 of the load sheave 4. A chain guide 43 is arranged in opposition to the load sheave 4.

A screw type mechanical brake assembly 6 comprises as shown in FIG. 3 a driven shaft 61 arranged in parallel with the driving shaft 2 and formed with a screw-threaded portion 62 and a pinion 63, a brake support member 64 having a boss 65 fixedly engaged with the threaded portion 62 of the driven shaft 61, a brake ratchet wheel 66 loosely or rotatably fitted on the boss 65 of the brake support member 64, a driven gear 67 engaged with the threaded portion 62 of the driven shaft 61 and adapted to be in mesh with the pinion 21 of the driving shaft 2, and friction plates 68 and 69 respectively interposed between the ratchet wheel 66 and the driven gear 67 and brake support member 64. As can be seen from FIG. 3, the pinion 63 of the driven shaft 61 is in mesh with the driving gear 42.

A brake pawl 71 is pivotally mounted on a shaft 70 fixed to the frame 5a as shown in FIG. 1 and urged by a spring (not shown) so as to engage the ratchet wheel 66. A reference numeral 81 denotes a rear frame. A hook 82 serves to hang the electric hoist from a ceiling or cross girder. The rotor shaft 11 and driving shaft 2 are journaled in bearings in the front frame 19, frames 5 and 5a and rear frame 81. The driven shaft 61 is also journaled in bearings in the frames 5a and the rear frame 81.

The operation of the electric hoist constructed as above mentioned according to the invention will be explained hereinafter. When the motor 1 is energized for lifting or winding up a load, the attractor elements 14 in the magnetic pole 13 are magnetized to attract the attracted body 15 to the magnetic pole 13 against the force of the spring 18 so that the disc 16 is moved to the left as viewed in FIG. 1 to release the braking action of the friction plate 17 so as to permit the rotor shaft 11 to be rotated in the winding-up direction. The rotation of the rotor shaft 11 is transmitted through the driving member 31, balls 35 and driven member 32 to the driving shaft 2.

The rotation of the driving shaft 2 is transmitted through its pinion 21 to the driven gear 67 (FIG. 3). As the driven gear 67 rotates, it moves to the right as viewed in FIGS. 1 and 3 on the threaded portion 62 of the driven shaft 61 owing to the threaded engagement therebetween to join the driven gear 67, ratchet wheel 66 and brake support member 64 together with the friction plates 68 and 69 interposed therebetween into a frictionally combined unit. Accordingly, the driven shaft 61 is rotated to cause the load sheave 4 to be rotated through the driving gear 42 engaged with the pinion 63, so that the load is lifted by a chain (not shown) wound about the load sheave 4. It is of course understood in this case that the rotating speed of the driving shaft 2 is considerably reduced through the reduction gear train including the pinion 21, driven gear 67, pinion 63 and driving gear 42 to be transmitted to the load sheave 4.

If a weight of the load is more than a rated value, the balls 35 of the clutch mechanism 3 slip relative to the driven member 32, so that the rotor shaft 11 is idly rotated without transmitting the torque of the rotor shaft to the driving shaft 2. As the load cannot be lifted under such a condition of the hoist, the hoisting or dragging of the overload is automatically prevented.

When the motor 1 is deenergized, the attracted body 15 is returned to its original position by means of the spring 18 to urge the friction plate 17 against the front frame 19 to cause the braking action which holds the hoisted load in its position.

When it is required to lower the load, the motor 1 is energized to rotate the rotor shaft 11 in a reverse direction or in the winding-off direction. The rotation of the rotor shaft 11 is transmitted through the clutch mechanism 3 to the driving shaft 2. The rotation of the driving shaft 2 is then transmitted to the pinion 21 and driven gear 67 so that the load is lowered with the aid of the mutual action of the weight of the load and the mechanical brake assembly 6.

If an overload occurs during lowering the load, the balls 35 of the clutch mechanism 3 are slipped relative to the driven member 32, so that the torque on the rotor shaft 11 is not transmitted to the driving shaft 2. Accordingly, even if a stopper (not shown) provided on one end of the chain wound about the load sheave 4 remote from the other end suspending the load strikes the chain guide 43 at the lowermost position of the load, the lowering of the load is stopped without any damage of the chain guide 43, thereby automatically preventing the lowering of the overload. The electric hoist according to the invention can therefore dispense with a limit switch for detecting the lowermost position for winding-off a load.

Moreover, even if the mechanical brake assembly 6 is clamped to an excess extent when a lifting load is stopped, the load can be securely lowered without stoppage of the load during lowering because the winding-off torque of the overload safety device 3 has been set to be larger than the friction transmission force of the mechanical brake assembly 6.

FIG. 4 illustrates another embodiment of the invention wherein like components having the same functions are designated by the same reference numerals and will not be described in further detail. In this embodiment, the rotor shaft 11 and the driving shaft 2 are connected to each other by means of a connecting member 24 fitted on the respective shafts through spline grooves, and the mechanical brake assembly 6 further includes a clutch mechanism 3*a*. As shown in FIGS. 4 and 5, the mechanical brake assembly 6 comprises a brake support member 64 having a boss 65 fixedly engaged with the threaded portion 62 of the driven shaft 61, a brake ratchet wheel 66 loosely or rotatably fitted on the boss 65 of the brake support member 64, a retainer member 31*a* having a shaft 31*b* threadedly engaged with the threaded portion 62 of the driven shaft 61, a driven gear 67*a* loosely or rotatably fitted on the shaft 31*b* of the retainer member 31*a* and the like. Between the retainer member 31*a* and the driven gear 67*a* is provided a clutch mechanism 3*a* similar to that shown in FIGS. 1 and 2. Reference numeral 37*a* denotes resilient urging means such as a plurality of dish-shaped springs for urging the driven gear 67*a* and whose spring force is preferably adjustable by means of a nut threadedly engaged with a threaded portion formed in an end of the shaft 31*b* of the retainer member 31*a*.

This clutch mechanism 3*a* is constructed such that the transmission force in the winding-off direction is larger than that in the winding-up direction owing to the difference in resistance when the mechanism is slipped in the same manner as in the clutch mechanism shown in FIG. 2.

FIGS. 6*a* and 6*b* illustrate important parts of a further embodiment of the clutch mechanism according to the invention. With this embodiment instead of the balls 35, slide elements 35*a* having a pentagonal cross-section are used, each including a steep slope surface 35*b* for the winding-off direction and a gentle slope surface 35*c* for the winding-up direction. The driving member 31 and the driven member 32 are formed respectively with recesses 33*a* and 34*a* corresponding to the slide elements 35*a*. Each one is a square recess 33*a* and the other one is a particular recess 34*a* having a steep slope surface and a gentle slope surface correspondingly to the surfaces of the element 35*a*. This arrangement can accomplish the same function and effect as those in FIG. 2.

In the above description, the invention is explained with the electric hoist. However, this invention is not limited to this application but can be applied to manually operated hoists. Moreover, examples of the one-way clutch has been shown in FIGS. 2 and 6. However, any other one-way clutch may be used for this purpose. Moreover, instead of the screw type mechanical brake assembly, a cam type mechanical brake assembly may be used. Furthermore, the recesses having steep and gentle slope portions are formed in the driven member in the above embodiments. However, such recesses may be formed in the driving member. Moreover, the clutch mechanism as above described may be provided in the reduction gear train, for example, in the driving gear, although the clutch mechanism has been provided between the rotor shaft and driving shaft or in the mechanical brake assembly in the above embodiments.

As can be seen from the above description, the hoist according to the invention comprises in the torque transmission system a clutch mechanism constructed as its winding-off torque larger than its winding-up torque, thereby automatically preventing the lifting, lowering or dragging of a load under overload condition, and enabling the once lifted load to be securely lowered regardless of its light or heavy weight. Moreover, the clutch mechanism according to the invention comprises slide elements between driving and driven members and resilient urging means uniformly urging the entire clutch mechanism, so that the hoist according to the invention is simple in construction, easy to assemble and adjust and suitable for mass-production. Therefore, the electric hoist according to the invention brings about significant effects in actual use.

It is further understood by those skilled in the art that the foregoing description is that of preferred embodiments of the disclosed hoists and that various changes and modifications may be made in the invention without departing from the spirit and scope thereof.

What is claimed is:

1. A hoist including a shaft driven by external force, a driving shaft connected to said shaft, a reduction gear train for transmitting rotation of said driving shaft to a load sheave, a mechanical brake assembly in said reduction gear train, and an overload safety device having a clutch mechanism capable of transmitting torque larger in driving said load sheave in a winding-off direction than that in a winding-up direction, said clutch mechanism comprising a disc-like driving member, a disc-like driven member, surfaces of these members facing to each other being formed with a plurality of recesses which are arranged in circles on the surfaces of these members and in opposition to each other, slide elements each accommodated in each set of said opposite recesses respectively formed in the these members, and resilient urging means for urging said slide elements between said driving and driven members, any one of each set of the recesses having a gentle slope surface facilitating each said slide element to ride thereon and slip when driving said load sheave in the winding-up direction, and said clutch mechanism axially arranged directly between said shaft driven by external force and said driving shaft connected to said shaft.

2. A hoist as set forth in claim 1, wherein said slide elements are balls, and wherein each of said recesses formed in any one of said driving and driven members is a circular recess to snugly accommodate therein substantially one half of each of balls, and each of said recesses in opposition to the above circular recesses consists of a semicircular portion to be fitted with said ball and said gentle slope surface.

3. A hoist as set forth in claim 1, wherein said slide elements are pentagonal bodies each including a steep slope surface and said gentle slope surface, and wherein each of said recesses formed in any one of said driving and driven members is a square recess to snugly accommodate therein substantially one half of each said pentagonal body and each of said recesses in opposition to the above square recesses has a steep slope surface and the gentle slope surface corresponding to surfaces of the slide element.

4. An electric hoist as set forth in claim 2, wherein said resilient urging means is at least one dish-shaped spring and is made adjustable by a nut.

5. A hoist including a shaft driven by external force, a driving shaft connected to said shaft, a reduction gear train for transmitting rotation of said driving shaft to a load sheave, a mechanical brake assembly in said reduction gear train, and an overload safety device having a clutch mechanism integrally arranged in said mechanical brake assembly and capable of transmitting torque larger in driving said load sheave in a winding-off direction than that in a winding-up direction, said clutch mechanism comprising a disc-like driving member, a disc-like driven member, surfaces of these members facing to each other being formed with a plurality of recesses which are arranged in circles on the surfaces of these members and in opposition to each other, slide elements each accommodated in each set of said opposite recesses respectively formed in these members, and resilient urging means for urging said slide elements between said driving and driven members, any one of each set of the recesses having a gentle slope surface facilitating each said slide element to ride thereon and slip when driving said load sheave in the winding-up direction.

6. A hoist as set forth in claim 5, wherein said slide elements are balls, and wherein each of said recesses formed in any one of said driving and driven members is a circular recess to snugly accommodate therein substantially one half of each of said balls, and each of said recesses in opposition to the above circular recesses consists of a semicircular portion to be fitted with said ball and said gentle slope surface.

7. A hoist as set forth in claim 5, wherein said slide elements are pentagonal bodies each including a steep slope surface and said gentle slope surface, and wherein each of said recesses form in any one of said driving and driven members is a square recess to snugly accommodate therein substantially one half of each said pentagonal body and each of said recesses in opposition to the above square recesses has a steep slope surface and the gentle slope surface corresponding to surfaces of the slide element.

8. An electric hoist as set forth in claim 6, wherein said resilient urging means is at least one dish-shaped spring and is made adjustable by a nut.

* * * * *